United States Patent [19]

Kaneko

[11] Patent Number: 4,848,695
[45] Date of Patent: Jul. 18, 1989

[54] SPINNING REEL FOR FISHING

[75] Inventor: Kyoichi Kaneko, Tokyo, Japan

[73] Assignee: Daiwa Seiko Inc., Tokyo, Japan

[21] Appl. No.: 196,825

[22] Filed: May 9, 1988

Related U.S. Application Data

[63] Continuation of Ser. No. 847,715, Apr. 3, 1986, abandoned.

[30] Foreign Application Priority Data

Apr. 19, 1985 [JP] Japan ............................ 60-58759

[51] Int. Cl.[4] ............................................ A01K 89/01
[52] U.S. Cl. .................................................... 242/232
[58] Field of Search ................... 242/84.2 F, 84.21 R, 242/84.2 G

[56] References Cited

U.S. PATENT DOCUMENTS

| | | | |
|---|---|---|---|
| 3,233,845 | 2/1966 | Inamura | 242/84.2 F |
| 4,095,756 | 6/1978 | Morishita | 242/84.2 G |
| 4,350,312 | 9/1982 | Masclet | 242/84.2 G |
| 4,676,450 | 6/1987 | Carpenter | 242/84.21 R |
| 4,747,559 | 5/1988 | Hitomi | 842/84.21 R |

FOREIGN PATENT DOCUMENTS

| | | | |
|---|---|---|---|
| 49-7198 | 2/1974 | Japan | 242/84.2 G |
| 53-32191 | 3/1978 | Japan | 242/84.2 G |
| 135983 | 6/1952 | Sweden | 242/84.2 F |

*Primary Examiner*—Stuart S. Levy
*Assistant Examiner*—Katherine Matecki
*Attorney, Agent, or Firm*—Browdy and Neimark

[57] ABSTRACT

A spinning reel for fishing in which a coil spring is used to urge the bail toward a position for winding the fishing line and a position for releasing the fishing line. The base portion of the spring is deflected toward one side of base portion of a bail arm-mounting arm to strongly urge the bail toward the position for releasing the fishing line but to weakly urge the bail toward the position for winding the fishing line. Therefore, the bail is not erroneously operated by the inertial force of when the fishing line is being casted and the fishing line is not cut when it is being released.

3 Claims, 2 Drawing Sheets

SPINNING REEL FOR FISHING

This application is a continuation of application Ser. No. 847,715, filed 04-03-86, now abandoned.

BACKGROUND OF THE INVENTION

1. Field of the Invention:

The present invention relates to an improved bail inverting mechanism used in a spinning reel for fishing, which features simplicity in the bail inverting mechanism and improved operation performance.

2. Prior Art:

Bail inverting mechanisms of spinning reels for fishing of the type employing a compression coil spring have been disclosed in Japanese Utility Model Publication No. 7198/1974 and Japanese Utility Model Laid-Open No. 32191/1978. According to these bail inverting mechanisms, however, the base portion of the coil spring is provided at the center of base portion of a bail arm-mounting arm on an extension from a point where a bail arm is pivoted, so that the bail arm is urged to swing toward a position for winding the fishing line and a position for releasing the fishing line each by an equal angle. At the time of casting the fishing line, therefore, the bail often operates erroneously due to the inertial force; i.e., the bail swings back to the position for winding the fishing line so that the fishing line being released is cut.

According to the conventional systems, furthermore, the coil spring is held in a cylinder that is pivotted to the bail arm-mounting arm, and an operation rod anchored to the bail arm is inserted in the cylinder. When the coil spring expands or contracts, therefore, large frictional resistance develops among the individual members. Furthermore, the operation lacks smoothness due to sea water or sand that has infiltrated. Moreover, an increased number of parts makes it cumbersome to manufacture the spinning reel, to repair the spinning reel, or to assemble and disassemble the spinning reel.

SUMMARY OF THE INVENTION

The present invention is to improve such defects inherent in the prior art, and its first feature is to provide a spinning reel for fishing in which a coil spring is used to urge the bail toward a position for winding the fishing line and a position for releasing the fishing line, the base portion of the spring being deflected toward one side of a base portion of a bail arm-mounting arm to strongly urge the bail toward the position for releasing the fishing line but to weakly urge the bail toward the position for winding the fishing line, so that the bail will not be erroneously operated by the inertial force when the fishing line is being casted and that the fishing line will not be cut when it is being released.

A second feature of the present invention is to provide a spinning reel for fishing in which the bail inverting mechanism is constituted by only two parts which are a coil spring and a rod-like operation member having an engaging portion at the middle portion thereof, in order to simplify the structure, to reduce the weight, and to reduce the manufacturing cost, and so that the spinning reel can be easily assembled or manufactured and disassembled when it is to be repaired.

A third feature of the present invention is to provide a spinning reel for fishing in which the operation rod of the bail inverting mechanism is loosely inserted in the coil spring and compresses the coil spring at its engaging portion, preventing the sliding motion of the cylindrical members from being impaired by sea water or sand which may infiltrate thereinto, that often occurred in the conventional systems, and ensuring smooth operation over extended periods of time.

DESCRIPTION OF THE PREFERRED EMBODIMENT

Figure 1:
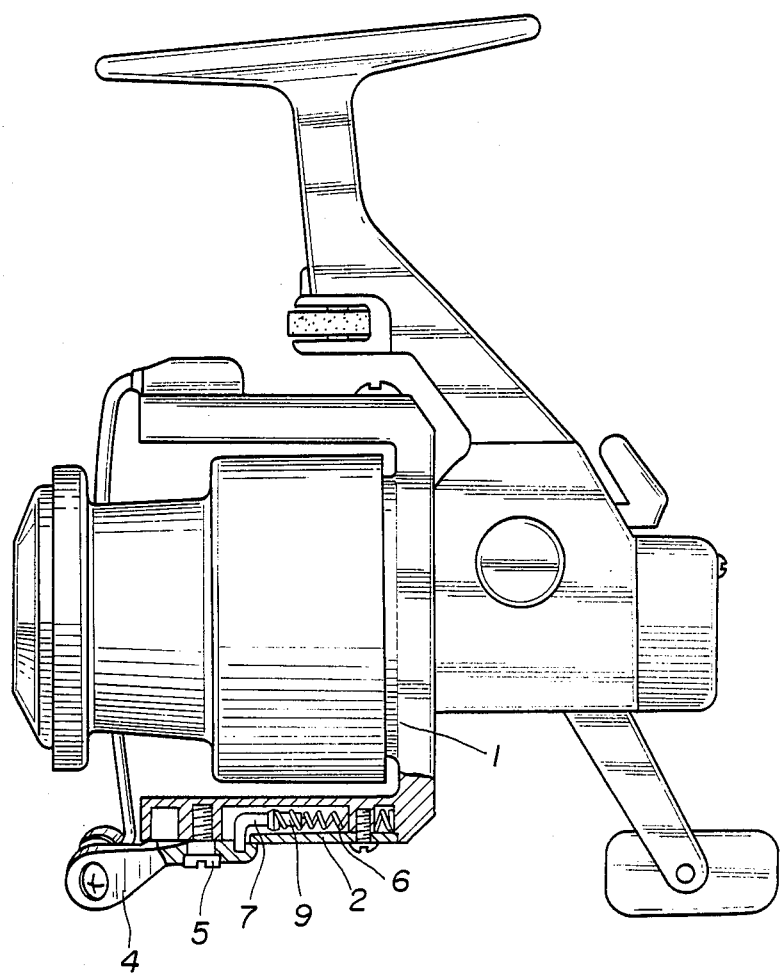
FIG. 1 is a partly cut-away front view which illustrates the present invention.

An embodiment of the invention will now be explained in conjunction with the drawings. A rotor 1 of the spinning reel is turned by a handle in a customary manner, and has at its rear portion a pair of bail arm-mounting arms 2, 2 that protrude frontwardly. To the ends of the bail arm-mounting arms 2, 2 are attached, via a shaft 5, bail arms 4 that are fitted to both ends of a bail 3 in a traditional manner. A coil spring 6 is anchored, to the end portion in the bail arm-mounting arm to which is pivoted a bail arm 4 of the side that has a line roller 31, in a manner so as to be deflected to one side. In the coil spring 6 is inserted a nearly straight operation rod 7 that is anchored in the bail arm 4 at a position displaced from a portion where the bail arm 4 is pivoted. An engaging portion 8 formed at a middle portion of the operation rod 7 engages with the upper end of the coil spring 6.

The lower end of the operation rod 7 should be slightly curved to produce the guide function. A cover 9 is provided on the surface of the bail arm-mounting arm 2.

Figure 2:
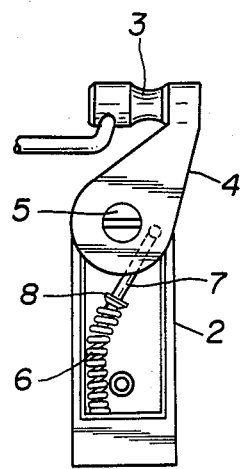
FIG. 2 is a side view showing a major portion of the invention when winding the fishing line with the cover being removed.
Figure 3:
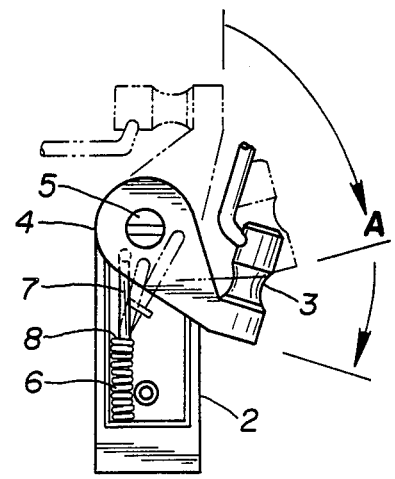
FIG. 3 is a side view of when releasing the fishing line.
Figure 4:
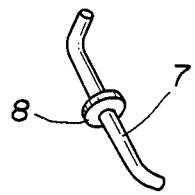
FIG. 4 is a perspective view of the operation rod.

The embodiment of the present invention is constructed as described above. To release the fishing line, the bail arm 4 is turned in the clockwise direction against the resilient force of the coil spring 6 starting from the position for winding the fishing line shown in FIG. 2. As the bail arm 4 rotates, the operation rod 7 is pushed down and the engaging portion 8 compresses the coil spring 6 to a maximum at the dead point A. As the bail arm 4 passes over the dead point A, the coil spring 6 then starts to expand and bail arm 4 is then forcefully urged by the force of the compressed coil spring 6 to the position for releasing the fishing line as shown by the solid lines in FIG. 3. If the bail arm 4 is turned in the counterclockwise direction starting from the position for releasing the fishing line of FIG. 3 as a result of turning the handle, the bail arm 4 is urged toward the position for winding the fishing line just when the dead point A of the coil spring 6 is passed. In this case, in travel toward the winding position, however, the bail arm 4 is urged by a force which is smaller than a force which urges the bail arm 4 toward the direction of releasing the fishing line. The coil spring 6 is mounted in the bail arm-mounting arm 2 so that it is compressed linearly in the release position after passing dead point A as shown in FIG. 3, exerting a stronger force to move bail arm 4 to the extreme release position than when it is moved upward past dead point A toward the winding position of FIG. 2, where it is compressed to a lesser extent and has a bend in coil spring 6 when the bail arm 4 is in the winding position.

According to the present invention as described above, the operation rod anchored to the bail arm is inserted in the coil spring that is provided at an end portion of the bail arm-mounting arm, the coil-spring being deflected toward one side. Further, the engaging portion formed at a middle portion of the operation rod engages with the upper end of the coil spring to forcefully urge the bail arm toward the position for releasing the fishing line. Therefore, the bail is not erroneously operated by the inertial force of when the fishing line is being casted, and the fishing line is not cut. Moreover, since the bail inverting mechanism is constituted by only two parts which are a coil spring and an operation rod, the structure can be simplified, the weight can be reduced, and the manufacturing cost can be reduced. Moreover, the spinning reel can be assembled and disassembled very easily. Furthermore, since there exists no slide motion among the individual members, the operation is not impaired even when the sea water has entered therein. Therefore, the spinning reel of the present invention offers improved durability without developing such trouble as improper bail operation.

What is claimed is:

1. A spinning reel for fishing, comprising:
   a handle for controlling winding of a fishing line;
   a spool with a winding drum for said fishing line, said spool having a back;
   means for supporting said spool, including a rotor supported at the back of said spool, said rotor having rear portions, and for rotating said rotor and reciprocally moving said spool in back and forth directions when said handle is rotated;
   a pair of bail arm-mounting arms protruding as a unitary structure from said rear portions of said rotor exteriorly along said fishing line winding drum of the spool, a first of said bail arm-mounting arms having a base portion;
   a pair of bail arms which are rotatably mounted on respective ends of said pair of bail arm-mounting arms for pivoting about a pivot axis which intersects each of said respective ends of said pair of bail arm-mounting arms, a first of said bail arms pivoting on said first bail arm-mounting arm, and a bail connecting between said pair of bail arms; and
   a bail inverting means including
      a coil spring with a first, lower end thereof mounted on said base portion of said first bail arm-mounting arm, said coil spring having an upper portion at an upper end of said coil spring opposite said lower end, and
      an operation member in the shape of a rod having a first end slidably inserted insaid upper portion of said coil spring through said upper end of said coil spring, said operation member having a middle portion and a second end anchored at a position on said first bail arm that is displaced from said pivot axis, said operation member including an engaging portion formed approximately at said middle portion of the operation member to engage with and abut against said upper end of the coil spring, said operation member above said engaging portion extending from said upper portion of said coil spring,
   wherein a dead point of maximum compression of said coil spring is defined on said first bail arm-mounting arm, said bail inverting means comprising means for mounting said coil spring on said base portion of said first bail arm-mounting arm such that said first bail arm is forcefully urged toward a first position on the first side of said dead point for releasing the fishing line, and more weakly urged toward a second position on the other side of said dead point for winding the fishing line, and said first end of the operation member inserted in said upper end of the coil spring guides said coil spring between said first and second positions for said urging and said weaker urging of said bail arm on opposite sides of said dead point, said means for mounting said coil spring causes said coil spring to be compressed along a straight line by said operation member connected to said bail arm in said first position, and compressed and bent by said operation member connected to said bail arm in said second position, and said coil spring being more compressed in said first position than in said second position.

2. A spinning reel for fishing, comprising:
   drive means including a handle for controlling winding of a fishing line;
   a spool with a winding drum for winding of said fishing line, said spool having a back;
   means for supporting said spool from said back thereof, including a rotor arranged at the back of said spool, and for rotating said rotor and reciprocally moving said spool in back and forth directions when said handle is rotated, said rotor having rear portions;
   a pair of bail-arm mounting arms protruding as a unitary structure from said rear portions of said rotor exteriorly along said fishing line winding drum of the spool;
   a pair of bail arms which are rotatably mounted on the ends of said pair of bail arm-mounting arms, and a bail connecting between said pair of bail arms; and
   a bail inverting means including
      a base portion on a first one of said bail arm-mounting arms,
      a coil spring having a first end mounted on said base portion of said first bail arm-mounting arm, said coil spring having a second end, and
      an operation member in the shape of a rod having a first end slidably inserted a predetermined amount into said second end of said coil spring, a second end of said operation member being anchored at a postion on a first one of said bail arms that is displaced from a pivot point of said first bail arm, said operation member including an engaging portion formed nearly at a middle portion of the operation member to engage with said second end of the coil spring to determine said predetermined amount;
   means for mounting said coil spring on said base portion of said first bail arm-mounting arm to define a dead point for said coil spring;
   wherein said first bail arm is forcefully urged toward a first position on a first side of said dead point for releasing the fishing line and relatively more weakly urged toward a second position on the other side of said dead point for winding the fishing line, and said coil spring is housed within said first bail arm-mounting arm wherein said means for mounting said coil spring causes said coil spring to be compressed along a straight line by said operation member connected to said bail arm in said first position, and compressed and bent by said operation member connected to said bail arm in said second position, and said coil spring being more compressed in said first position than in said second position.

3. A spinning reel for fishing, comprising:

a handle for controlling winding of a fishing line;

a spool with a winding drum for said fishing line, said spool having a back;

means for supporting said spool, including a rotor supported at the back of said spool, and for rotating said rotor and reciprocally moving said spool in back and forth directions when said handle is rotated, said rotor having rear portions;

a pair of bail arm-mounting arms protruding as a unitary structure from said rear portions of said rotor exteriorly along said fishing line winding drum of the spool, a first of said bail arm-mounting arms having a base portion, each said bail arm-mounting arm including an end away from said rotor;

a pair of bail arms which are rotatably mounted at a pivot axis extending through said ends of said pair of bail arm-mounting arms, a first of said bail arms pivoting on said first bail arm-mounting arm, and a bail connecting between said pair of bail arms; and a bail inverting means including a coil spring housed within said first bail arm-mounting arm and having a first, lower end thereof mounted on said base portion of said first bail arm-mounting arm, said coil spring having an upper portion with an upper second end opposite said first, lower end, and an operation member in the shape of a rod having a first end slidably inserted in said upper portion of said coil spring through said upper end of said coil spring, said operation member having a middle portion and a second end anchored at a position on said first bail arm that is displaced from said pivot axis, said operation member including an engaging portion formed substantially at said middle portion of the operation member to engage with and abut against said second end of the coil spring, said operation member above said engaging portion extending from said upper portion of said coil spring, means for mounting said first end of said coil spring on said base portion of said first bail arm-mounting arm to provide biasing forces on said first bail arm, said coil spring having a dead point on said first bail arm, said coil spring being movable between first and second limiting positions by pivoting movement of said first bail arm, said first and second limiting positions being located on respective opposing sides of said dead point, the first and the second of said limiting positions corresponding to a release position and a winding position of said bail, respectively, the mounting means being located such that the biasing force of said coil spring on said first bail arm is greater in said first limiting position than in said second limiting position, whereby said bail withstands inertial force during casting to remain in said release position during said casting, and such that said coil spring is compressed approximately along a straight line when said bail is in said release position and compressed to a lesser extent and to have a bend in said coil spring when said bail is in said winding position.

* * * * *